United States Patent
Wiktorowicz et al.

(10) Patent No.: US 12,228,727 B1
(45) Date of Patent: Feb. 18, 2025

(54) POLARIZATION-AIDED IMAGE CONTRAST ENHANCEMENT WITH ROTATING POLARIZATION ELEMENT AND CONTROL SOFTWARE

(71) Applicant: The Aerospace Corporation, El Segundo, CA (US)

(72) Inventors: Sloane J. Wiktorowicz, Long Beach, CA (US); David J. Gutierrez, Long Beach, CA (US); Kirk B. Crawford, Lomita, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 18/458,936

(22) Filed: Aug. 30, 2023

(51) Int. Cl.
| | |
|---|---|
| G02B 26/06 | (2006.01) |
| G02B 5/30 | (2006.01) |
| G02B 23/02 | (2006.01) |
| G02B 23/12 | (2006.01) |
| G02B 27/28 | (2006.01) |

(52) U.S. Cl.
CPC ........... *G02B 26/06* (2013.01); *G02B 5/3083* (2013.01); *G02B 23/02* (2013.01); *G02B 23/12* (2013.01); *G02B 27/288* (2013.01)

(58) Field of Classification Search
CPC ...... G02B 26/06; G02B 5/3083; G02B 23/02; G02B 23/12; G02B 27/288
See application file for complete search history.

(56) References Cited

U.S. PATENT DOCUMENTS

| | | | |
|---|---|---|---|
| 4,362,387 A | 12/1982 | Clark | |
| 5,412,500 A | 5/1995 | Fergason | |
| 6,546,208 B1 | 4/2003 | Costales | |
| 7,397,604 B2 | 7/2008 | Hruska | |
| 8,358,413 B1 * | 1/2013 | Pinhasov | G02B 27/281 |
| | | | 356/364 |

(Continued)

FOREIGN PATENT DOCUMENTS

WO 2013090843 A1 6/2013

OTHER PUBLICATIONS

Harness, et al., Starshade Technology Development Activity Milestone 2 Report, https://exoplanets.nasa.gov/internal_resources/2526/.

(Continued)

*Primary Examiner* — Thanh Luu
*Assistant Examiner* — Mai Thi Ngoc Tran
(74) *Attorney, Agent, or Firm* — LeonardPatel PC

(57) ABSTRACT

Polarization-aided image contrast enhancement is disclosed. A rotatable polarizing element (e.g., a linear polarizer, waveplate and static polarization analyzer, etc.) may be inserted in front of an imaging camera (e.g., between the optics and camera of a telescope) to suppress a significant amount of polarized background sky brightness due to sunlight scattered by aerosols and gas particles in the sky and enhance imaging contrast of the field. This may be accomplished by installing a linear polarizer into a motorized rotation stage. As the polarizer rotates in the stage, transmitted sky brightness will vary sinusoidally with polarizer orientation. At any point in the sky and at any time, there will exist a polarizer orientation that minimizes transmitted sky intensity and maximizes contrast in the image.

21 Claims, 9 Drawing Sheets

(56) References Cited

U.S. PATENT DOCUMENTS

| | | | |
|---|---|---|---|
| 9,142,893 B2 | 9/2015 | Son et al. | |
| 2002/0088927 A1* | 7/2002 | Simchoni | G02B 27/281 |
| | | | 250/225 |
| 2007/0253063 A1 | 11/2007 | Hruska | |
| 2008/0008478 A1* | 1/2008 | Theis | H04B 10/1121 |
| | | | 398/182 |
| 2013/0307721 A1 | 11/2013 | Son et al. | |
| 2015/0124148 A1* | 5/2015 | Osoinach | H04M 1/72457 |
| | | | 348/335 |
| 2022/0125280 A1* | 4/2022 | Tyan | A61B 5/0035 |

OTHER PUBLICATIONS

McNish, Larry, "RASC Calgary Centre Daytime Stars", https://calgary.rasc.ca/daystars/index.htm.

Spectropolarimeter Telescope Observatory for UV Transmissions Project Definition Document, https://www.colorado.edu/aerospace/stout-pdd.

\* cited by examiner

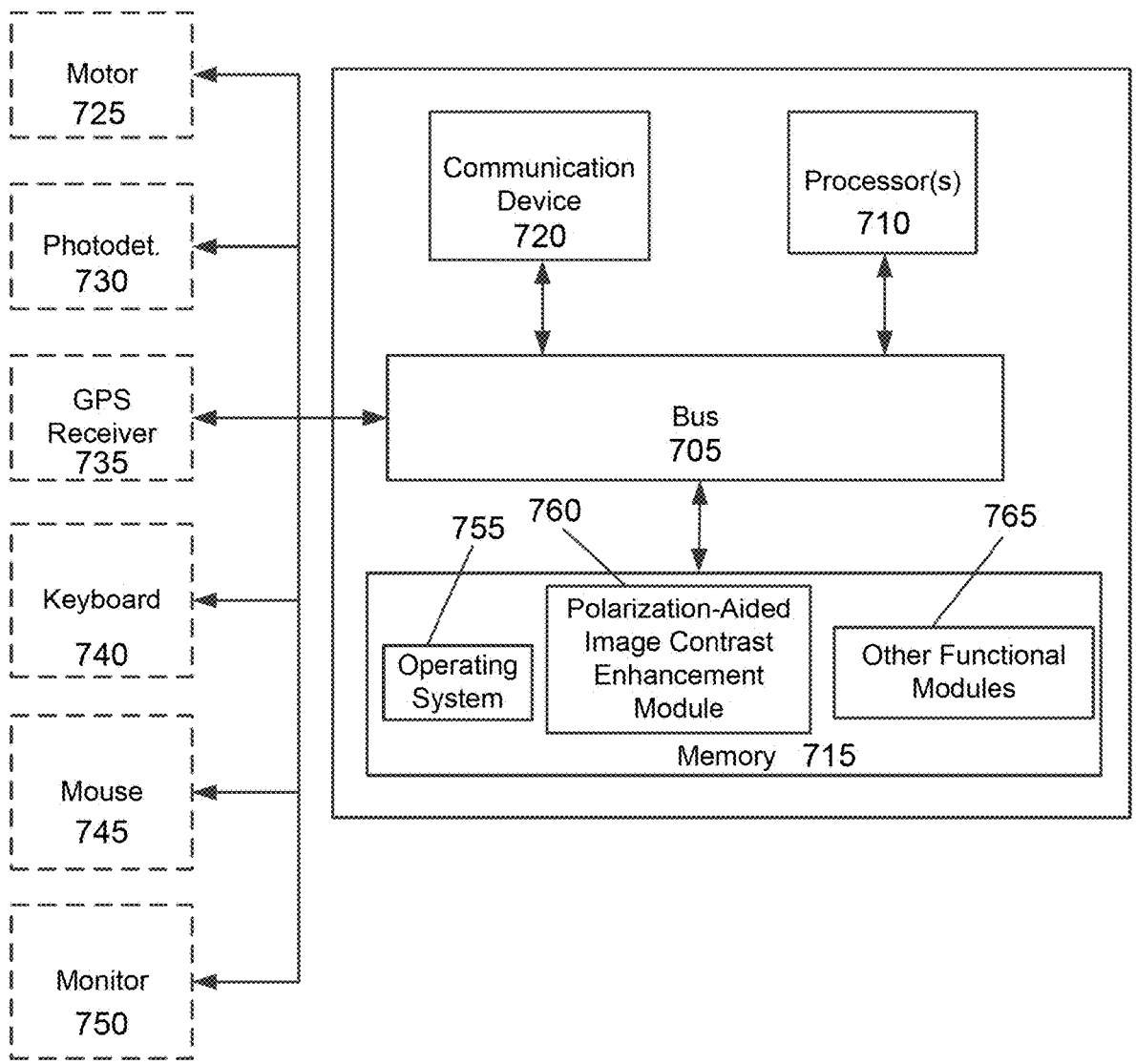

POLARIZATION-AIDED IMAGE CONTRAST ENHANCEMENT WITH ROTATING POLARIZATION ELEMENT AND CONTROL SOFTWARE

FIELD

The present invention generally pertains to imaging, and more particularly, to polarization-aided image contrast enhancement.

BACKGROUND

The current state of the art of image contrast enhancement utilizes either short-wave infrared (SWIR) imaging to reduce the brightness of Rayleigh scattering from the sky or software contrast improvement techniques such as unsharp masking and kernel deconvolution. However, the sun is brighter in visible light, so moving to SWIR wavelengths necessarily reduces the amount of light reflected by the object of interest. Also, SWIR cameras are significantly more expensive than visible light cameras and tend to saturate faster (e.g., shallower well depths), which limits integration time. Furthermore, SWIR cameras tend to have lower dynamic range (10 bit analog-to-digital converters (ADCs) instead of 16 bit), which limits intensity resolution.

Software contrast improvement techniques attempt to increase the signal-to-noise ratio (SNR) in the image after the signal (photons) has been converted to photoelectrons and read out. Saturated images may not necessarily receive any improvement in contrast due to software techniques because the well of each pixel has already "filled" with photoelectrons. Accordingly, an improved and/or alternative approach may be beneficial.

SUMMARY

Certain embodiments of the present invention may be implemented and provide solutions to the problems and needs in the art that have not yet been fully solved by existing imaging technologies. For example, some embodiments pertain to polarization-aided image contrast enhancement.

In an embodiment, a polarization-aided image contrast enhancement system includes a photodetector and a rotatable polarization element configured to receive light from one or more mirrors of a telescope and located in an optical path between the one or more mirrors of the telescope and the photodetector. The polarization-aided image contrast enhancement system also includes a computing system including memory and control software stored on the memory. The computing system is operably connected to the photodetector and the rotatable polarization element. The control software is configured to cause the computing system to control an orientation of the rotatable polarization element.

In another embodiment, a polarization-aided image contrast enhancement system includes a rotatable polarization element configured to receive light from one or more mirrors of a telescope. The polarization-aided image contrast enhancement system also includes a computing system including memory and control software stored on the memory. The computing system is operably connected to the rotatable polarization element. The control software is configured to cause the computing system to control an orientation of the rotatable polarization element.

In yet another embodiment, a polarization-aided image contrast enhancement system includes a rotatable polarization element configured to receive light from one or more mirrors of a telescope. The polarization-aided image contrast enhancement system also includes a computing system including memory and control software stored on the memory. The computing system is operably connected to the rotatable polarization element. The control software is configured to cause the computing system to determine an orientation of a telescope-to-sun vector position of the sun relative to a location of the telescope at a current date and time and command the rotatable polarizing element to rotate to the determined orientation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is an architectural diagram illustrating a computing system configured to perform polarization-aided image contrast enhancement, according to an embodiment of the present invention.

Unless otherwise indicated, similar reference characters denote corresponding features consistently throughout the attached drawings.

DETAILED DESCRIPTION OF THE EMBODIMENTS

Figure 1:
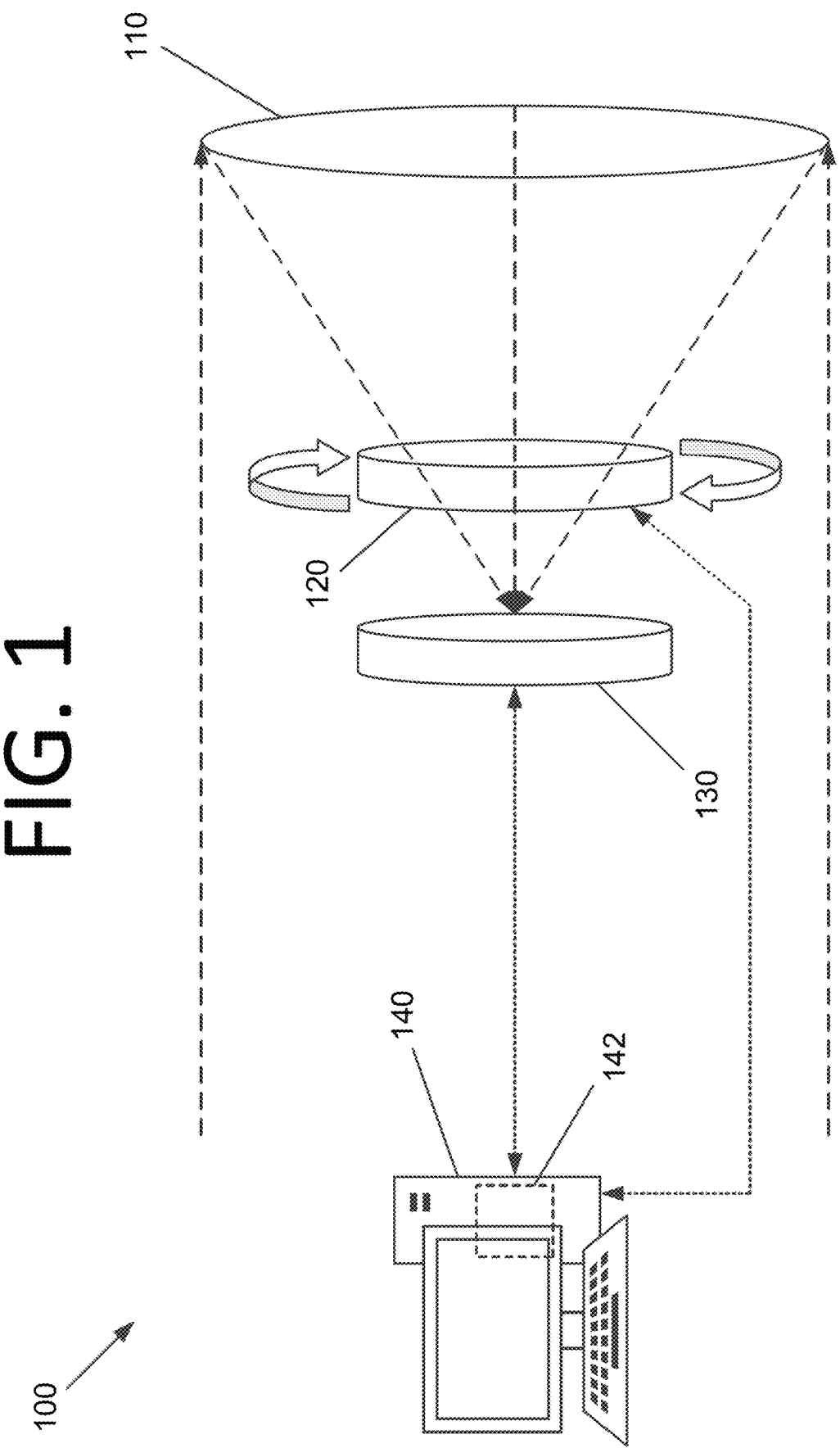
FIG. 1 is an architectural diagram illustrating a polarization-aided image contrast enhancement system, according to an embodiment of the present invention.

Some embodiments of the present invention pertain to polarization-aided image contrast enhancement. A rotatable polarizing element (e.g., a linear polarizer, a waveplate and static polarization analyzer, etc.) may be inserted in front of an imaging camera (e.g., between the optics and camera of a telescope) to suppress a significant amount of polarized background sky brightness due to sunlight scattered by aerosols and gas particles in the sky and enhance imaging contrast of the field. This may be accomplished by installing a linear polarizer into a motorized rotation stage. As the polarizer rotates in the stage, transmitted sky brightness will vary sinusoidally with polarizer orientation. At any point in the sky and at any time, there will exist a polarizer orientation that minimizes transmitted sky intensity and maximizes contrast in the image.

In this manner, contaminating, polarized sky photons may be selectively removed before they reach the well of the sensor, which enables longer integration times to be attained before saturating. Longer integration times directly translate to more photons detected from the object of interest. Some embodiments may be used for applications including, but not limited to, passive, daytime custody of aircraft, balloons, launch vehicles, stars, etc.

Some embodiments provide various advantages over existing image processing technologies. Image processing algorithms (e.g., kernel convolution, unsharp masking, matched filters, etc.) increase contrast unless the image is saturated. This requires limited exposure time, which is dominated by sky brightness. Some embodiments physically remove saturating photons before they reach the detector, enabling increased exposure times to collect more light from the target and amplify the SNR. Near-infrared (NIR) and SWIR imaging (0.7-2.5 micrometers (μm)) utilizes the $\lambda^{-4}$ nature of Rayleigh scattering, so the sky is relatively dark. However, the sun is also dimmer in infrared, so objects are dimmer in reflected light as well.

Infrared detectors have lower dynamic range than do visible light detectors, so intensity resolution is not as precise. Infrared detectors also tend to be significantly more expensive than visible light detectors. Some embodiments of the present invention, however, have been successfully demonstrated in visible light (400-700 nanometers (nm)), NIR (400-900 nm), and SWIR (1.6 μm) and may be paired with image processing algorithms and/or infrared imaging. The bright blue sky makes it difficult to image aircraft or celestial objects during the daytime from the ground.

Due to scattering of sunlight by aerosols and gas particles in the Earth's atmosphere, the sky is polarized. Technology to filter out the bright, polarized sky background increases the performance of ground-based sensors and makes them more attractive. Sunlight reflected by a vehicle or scattered by the atmosphere will have an excess of photons oscillating in a certain direction, which is perpendicular to the orientation of the sun-object-observer "scattering plane" for singly-scattered photons. This excess polarization may be measured, for example, with a linear polarizer installed in front of an imaging camera. To fully describe the linear polarization of light entering this sensor, the polarizer should be rotated to orientations of 0°, 45°, 90°, and 135°. Intensities/ measured at each orientation enable Stokes q and u to be measured, which are the fundamental observables in polarimetry, where:

$$q = \frac{(I_0 - I_{90})}{(I_0 + I_{90})} \tag{1}$$

$$u = \frac{(I_{45} - I_{135})}{(I_{45} + I_{90})} \tag{2}$$

From Stokes q and u, vector magnitude p and orientation θ may be calculated by:

$$p = \sqrt{(q^2 + u^2)} \tag{3}$$

$$\theta = \frac{1}{2}\arctan\left(\frac{u}{q}\right) \tag{4}$$

Contrast c for aircraft, balloons, stars, planets, etc. is given by:

$$c = \frac{I_{object}}{I_{sky}} \tag{5}$$

Seen from the ground, a patch of blue daytime sky may be up to p=100% polarized in visible light due to Rayleigh scattering. The orientation θ will be perpendicular to the sun-sky-observer scattering plane, so it will necessarily rotate with time and position on the sky as seen by the observer.

Rayleigh scattering is such an efficient polarizer of incident light that typical sky background is significantly more polarized than any other object in the sky. The sun itself is polarized at the less than $1\times10^{-6}$ level, while patches on the surface of the moon may vary from p=0% to 10%. Thus, inserting a rotatable, polarizing element (e.g., a linear polarizer, a waveplate and static polarization analyzer, etc.) in front of an imaging camera allows the observer to suppress a significant amount of background sky brightness and enhance imaging contrast of the field. This may be accomplished by installing a linear polarizer into a motorized rotation stage (e.g., a stepper motor). For instance, in some embodiments, a commercial off-the-shelf (COTS) linear polarizer or waveplate is inserted in a COTS rotation stage, reducing cost of the device. However, in some embodiments, the linear polarizer/waveplate+analyzer and/or rotation stage may be custom designed. As the polarizer rotates in the stage, transmitted sky brightness will vary sinusoidally with polarizer orientation. At any point in the sky and at any time, there will exist a polarizer orientation that minimizes transmitted sky intensity and maximizes contrast in the image.

FIG. 1 is an architectural diagram illustrating a polarization-aided image contrast enhancement system 100, according to an embodiment of the present invention. In some embodiments, some or all elements of system 100 may be part of a ground-based telescope, for example. System 100 includes telescope mirror(s) 110, a photodetector 130 (e.g., a photoconductor, a phototransistor, an avalanche photodetector (APD), a complementary metal-oxide semiconductor (CMOS) or charge-coupled device (CCD) imaging camera, etc.), and a rotatable polarizing element 120 (e.g., a linear polarizer, a waveplate and static polarization analyzer, etc. located on or otherwise operably connected to a rotation stage such that rotatable polarizing element 120 rotates about the optical axis). Photodetector 130 may be part of a camera in some embodiments. Rotatable polarizing element 120 is located in the optical path between telescope mirror(s) 110 and photodetector 130 and filters light passing therethrough. Filtered light from rotatable polarizing element 120 contacts photodetector 130, which may include an array of light-sensitive semiconductor photodiodes or pixels that produce a current when they absorb photons.

A computing system (e.g., a desktop computer, a laptop computer, a server, a tablet, a mobile phone, etc.) is communicably connected (directly, wirelessly, via the Internet, etc.) to rotatable polarizing element 120 and photodetector 130. In certain embodiments, a microcontroller (not shown) may receive and process output from photodetector 130 before sending the output to computing system 140. In some embodiments, computing system 140 may be computing system 700 of FIG. 7.

Computing system 140 includes control software 142 that controls the orientation of rotatable polarizing element 120 based on the location of the sun and the telescope or other optical system in which mirror(s) 110, rotatable polarizing element 120, and photodetector 130 are located. Based on these locations and the time of day, control software 142 orients rotatable polarizing element 120 to filter out polarized light from the atmosphere (potentially optimally). Polarizers such as rotatable polarizing element 120 have a fast axis, which is the axis of the light that the polarizer transmits on to photodetector 130. This fast axis should be pointed at the sun because Rayleigh scattered sunlight is polarized perpendicular to the sun-sky-observer scattering plane, and be modified by control software 142 to keep pointing at the sun as time passes. As time goes by, control software 142 continuously or periodically updates the orientation of rotating polarizer element 120. It should be noted that the rotation of rotatable polarizing element 120 differs from the potential altitude-azimuth rotation of the telescope about the optical axis to maintain tracking of the object of interest.

In some embodiments, one or more integrated circuits (ICs) of rotating polarizer element 120 (e.g., rotation stage controller circuit board 240 of FIG. 2A) are used to control rotation thereof. In some embodiments, control software 142 commands these IC(s) where to rotate to and how many steps of the motor to wind (in the case of a stepper motor) in order to rotate to the proper orientation. Optical encoders may indicate the number of steps that were moved and calculate how long to rotate the motor in order to achieve this number of steps.

Figure 2A:
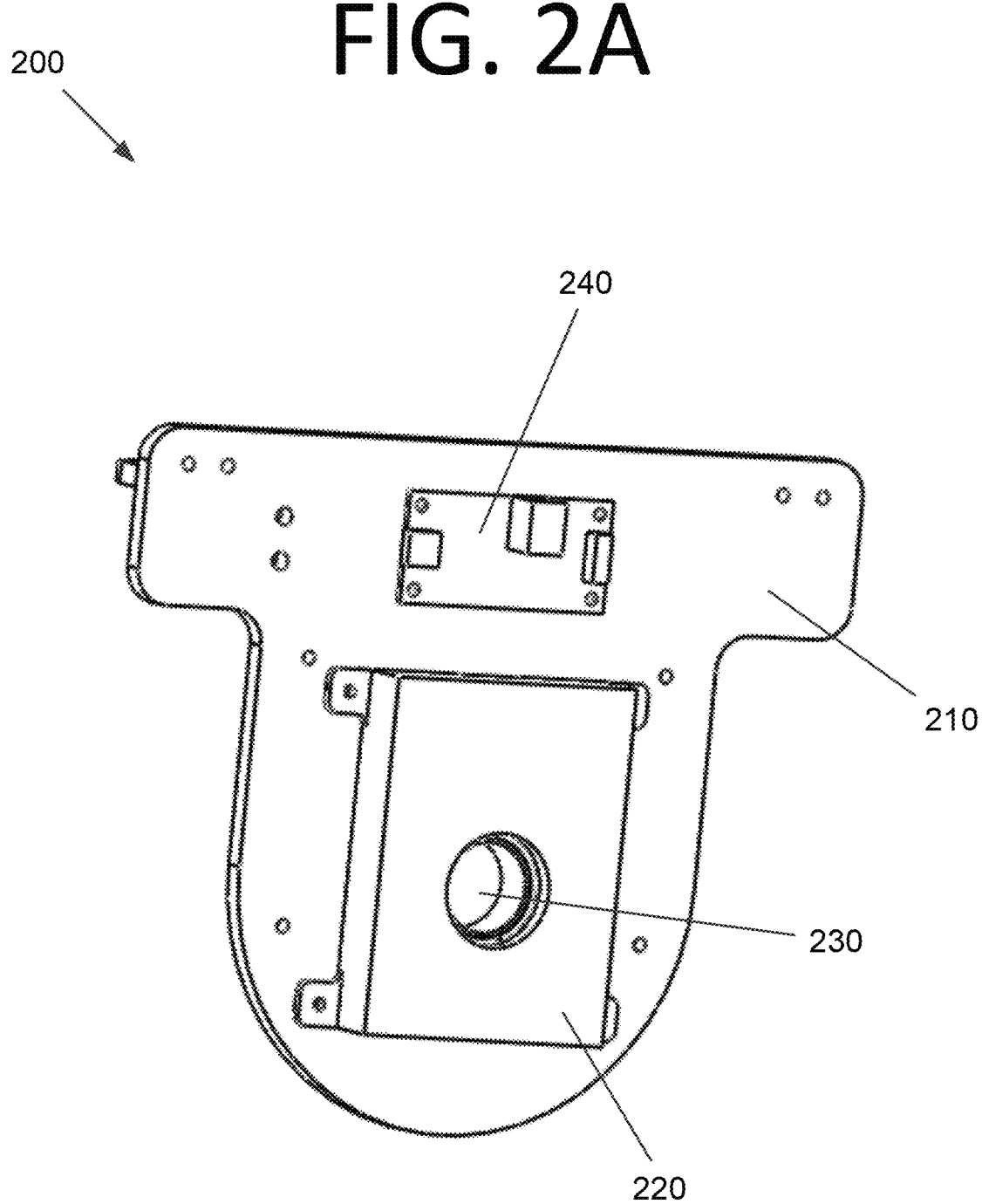
FIG. 2A is a perspective view illustrating a side of a linear polarizer mount/rotation stage that faces the telescope primary mirror away from the sky, according to an embodiment of the present invention.
Figure 2B:
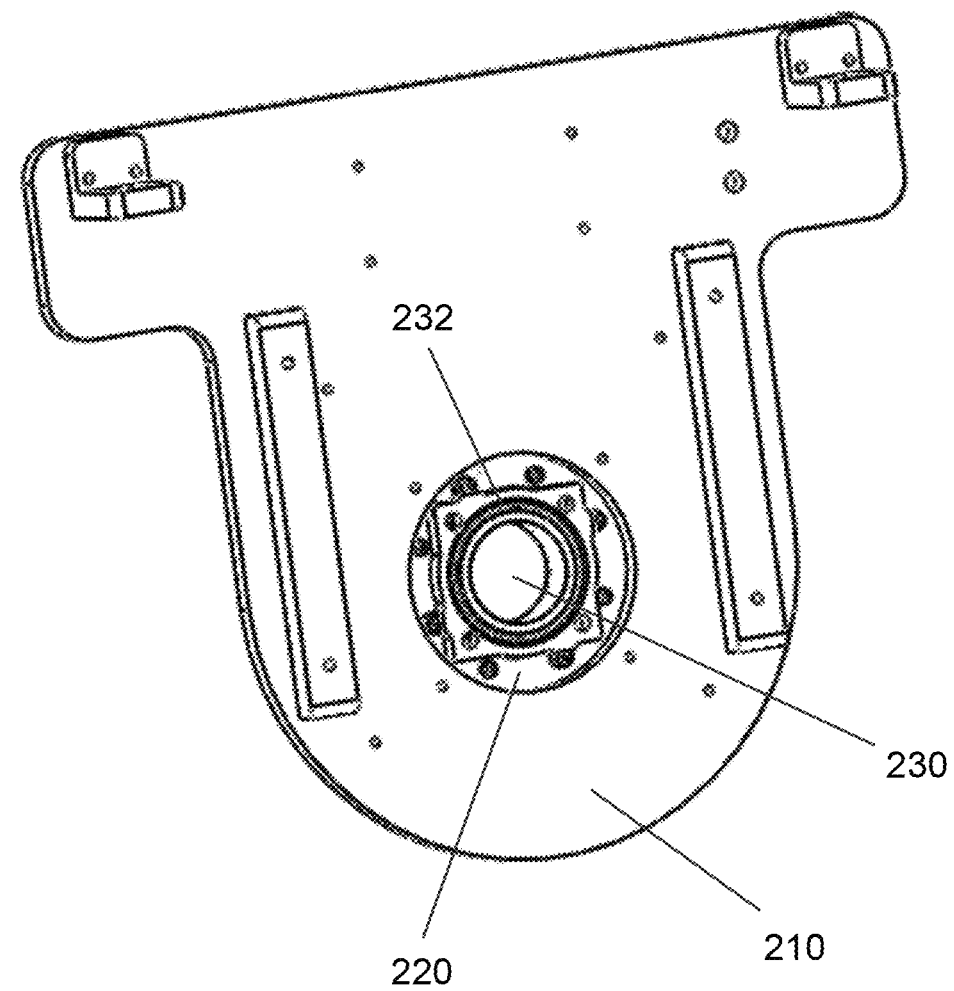
FIG. 2B is a perspective view illustrating the side of the linear polarizer mount/rotation stage that faces the sky, according to an embodiment of the present invention.

FIGS. 2A and 2B illustrate front and rear perspective views of a linear polarizer mount/rotation stage 200, according to an embodiment of the present invention. Polarizer 230 may be a glass plate with silver nanoparticles embedded in the substrate, where stretching of the substrate aligns the particles and acts to introduce polarization to the light passing through polarizer 230. However, any suitable optical material that polarizes incident light may be used without deviating from the scope of the invention. Polarizer 230 is held fast by a retaining ring 232 in a rotation stage 220, which is controlled by a controller circuit board 240 to rotate a certain number of steps (e.g., typically with much less than 1° precision). All of these components are mated to an interface plate 210, which is secured to the telescope. Each telescope may have its own design for interface plate 210 depending on its architecture, as well as its own required maximum size.

Figure 3:
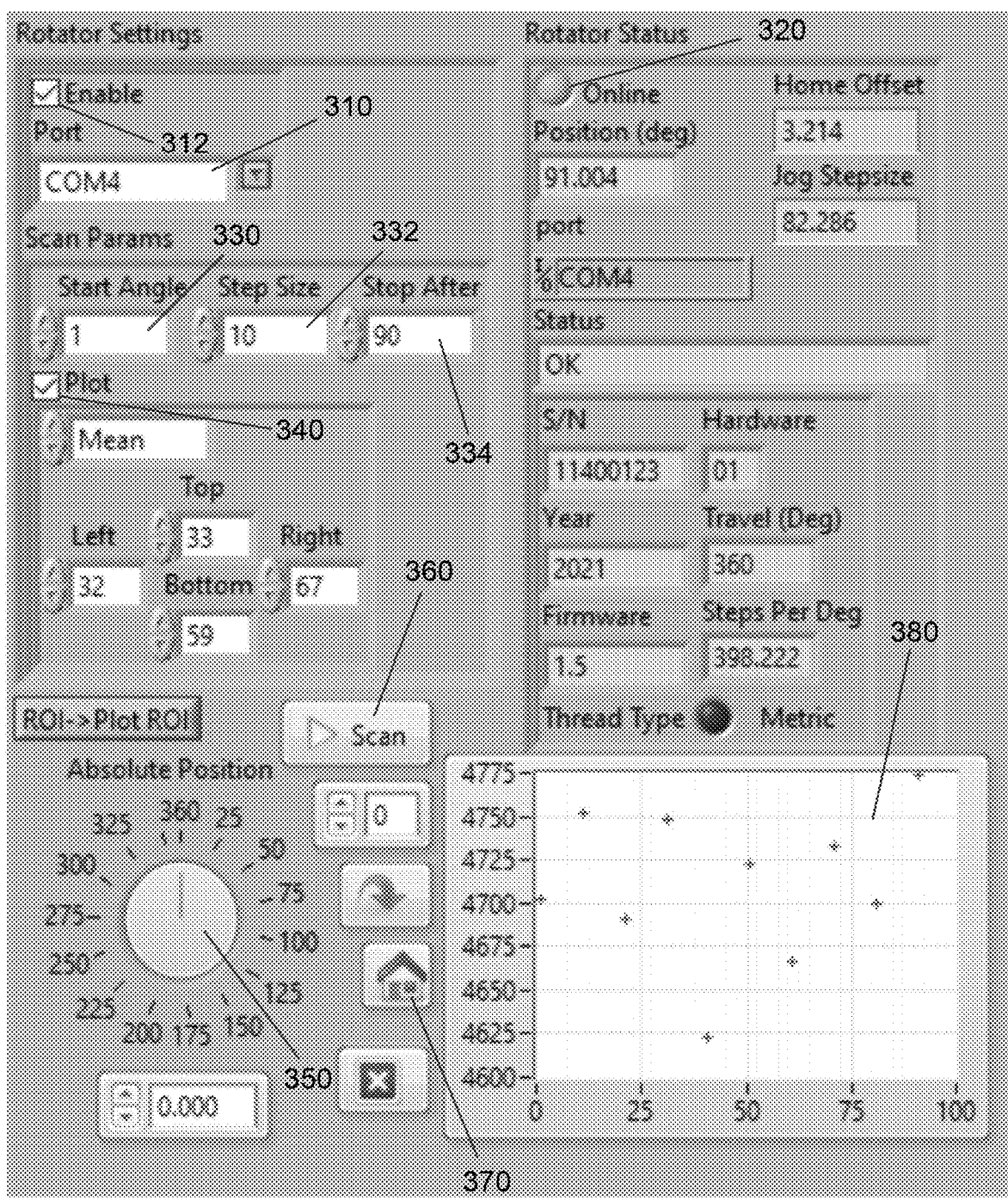
FIG. 3 is a screenshot illustrating a control software interface for controlling a rotating polarizer element, according to an embodiment of the present invention.

FIG. 3 is a screenshot illustrating a control software interface 300 for controlling a rotating polarizer element, according to an embodiment of the present invention. In this embodiment, a rotation stage controller circuit board (e.g., rotation stage controller circuit board 240 of FIG. 2A) is connected to a computing system (such as computing system 140 of FIG. 1 or computing system 700 of FIG. 7) via a universal serial bus (USB) or another suitable connector, which is registered by the operating system as a communication (COM) port. Selecting the COM port number 310 registered to the rotation stage controller circuit board (denoted as "COM4" in FIG. 3) and checking "Enable" box 312 allows two-way communication with the rotation stage controller circuit board. Control software interface 300 has a variety of parameters for control and feedback of the precise positioning of the linear polarizer (e.g., polarizer 230 of FIGS. 2A and 2B).

Rotator Status: When the correct COM port 310 is selected and Enable box 312 is checked, the Rotator Status Online light 320 shines green to indicate that two-way communication is successful.

Scan Parameters: Start Angle 330, Step Size 332, and Stop After 334 indicate the desired sequential rotation of the polarizer from the beginning (Start Angle 330) to the end (Stop After 334) of the sequence with pauses at each Step Size 332. For example, control software interface 300 indicates that the polarizer is prepared for a sequence of rotations from an orientation of 1° to 90° in 10° increments. Rotation from one orientation to another is typically accomplished in much less than one second of time.

Plot 340: These controls enable various plotting algorithms, which act to calculate and plot mean intensity on the detector (in this embodiment, a CMOS imaging camera) as a function of polarizer orientation (e.g., that shown in graph 380).

Absolute Position: Absolute Position of the polarizer may be commanded by clicking and dragging a dial 350 to the desired orientation in degrees. Additionally, text boxes exist to allow the user to type in the desired orientation, press return, and have the polarizer rotate to position.

Scan button 360: This executes Start Angle 330, Step Size 332, and Stop After 334 queue described above.

House button 370: This "homes" the polarizer. Homing is a process by which rotation stages spin until they reach a hardware limit switch or other device indicating the 0° position of the stage. This is beneficial because if the rotation stage controller loses power, it typically does not know its current position until homing is performed.

Figure 4:
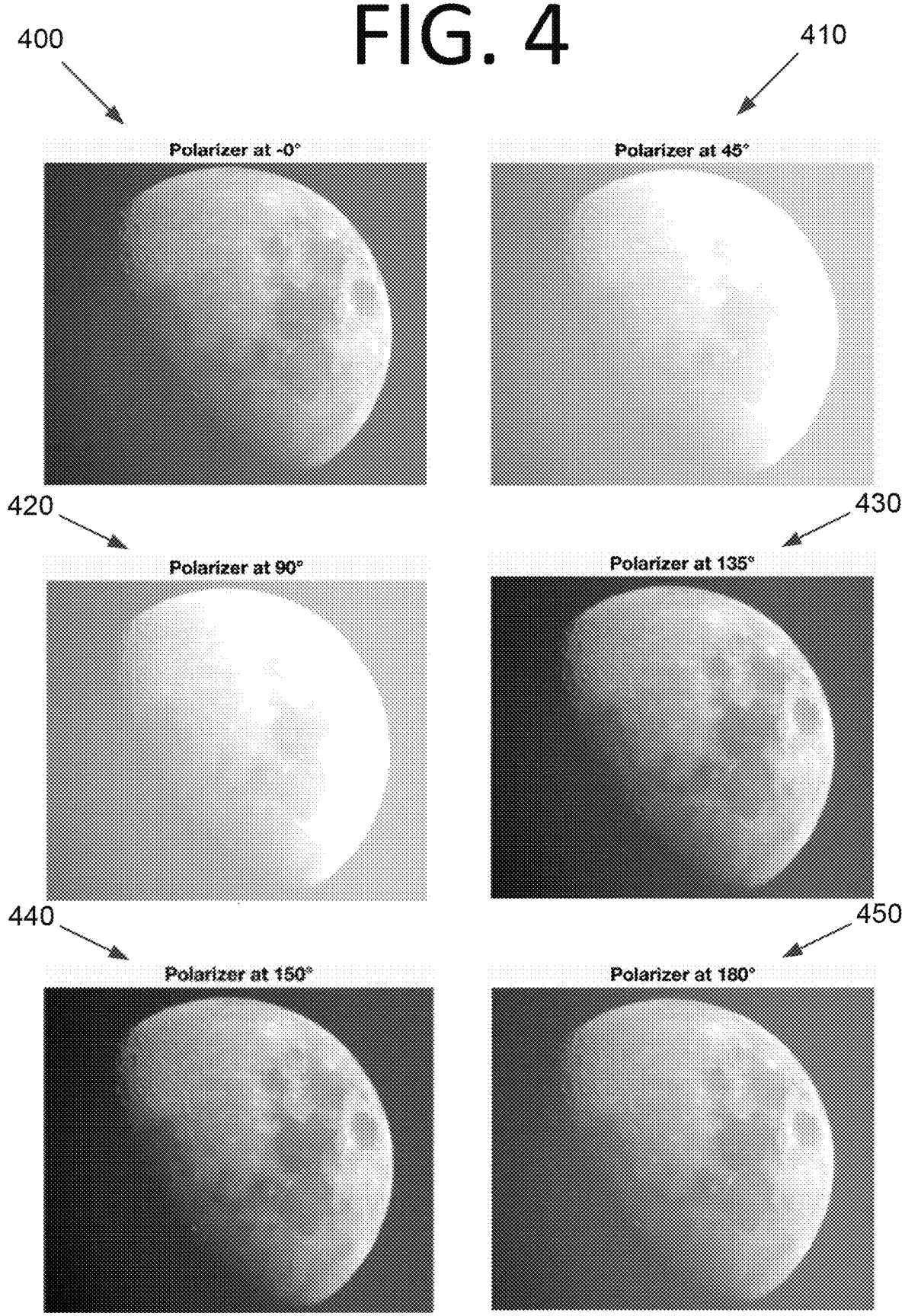
FIG. 4 illustrates images of the moon at polarizer orientations between 0° and 180°, according to an embodiment of the present invention.

FIG. 4 illustrates images 400, 410, 420, 430, 440, 450 of the moon at polarizer orientations of 0°, 45°, 90°, 135°, 150°, and 180°, respectively, according to an embodiment of the present invention. As can be seen, when initially rotated away from 0°, the image of the moon fades into the bright, daytime sky. However, as the orientation passes 90°, the contrast improves before fading again towards 180° (e.g., image 450). The best polarizer orientation for the moon in FIG. 4 is 150°.

Figure 5A:
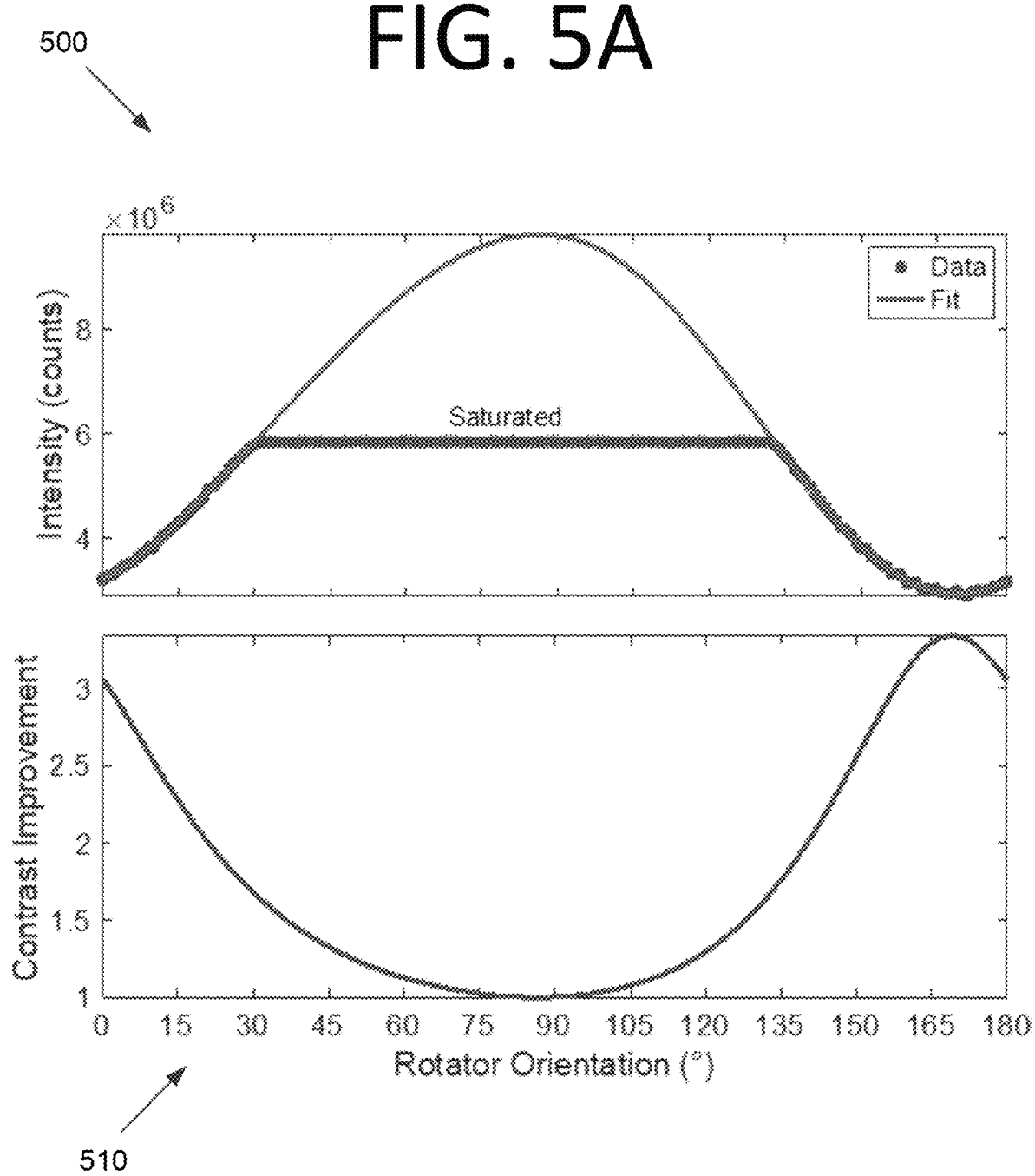
FIG. 5A illustrates intensity count and contrast improvement graphs for the 2.9 visual magnitude Pleiades star Alcyone, according to an embodiment of the present invention.

FIG. 5A illustrates intensity count and contrast improvement graphs 500, 510 for the 2.9 visual magnitude Pleiades star Alcyone, according to an embodiment of the present invention. Alcyone was observed at 2:15 pm Pacific Standard Time (PST) on Feb. 10, 2022. The best polarizer orientation of 169° provides a contrast improvement by a factor of 3.3. The sky polarization was approximately 54%. Images of the star were saturated (i.e., blown-out by glare) from sky brightness for most polarizer orientations. To reduce saturation without a polarizer, integration time would have to be reduced, which limits the detectability of the target.

Figure 5B:
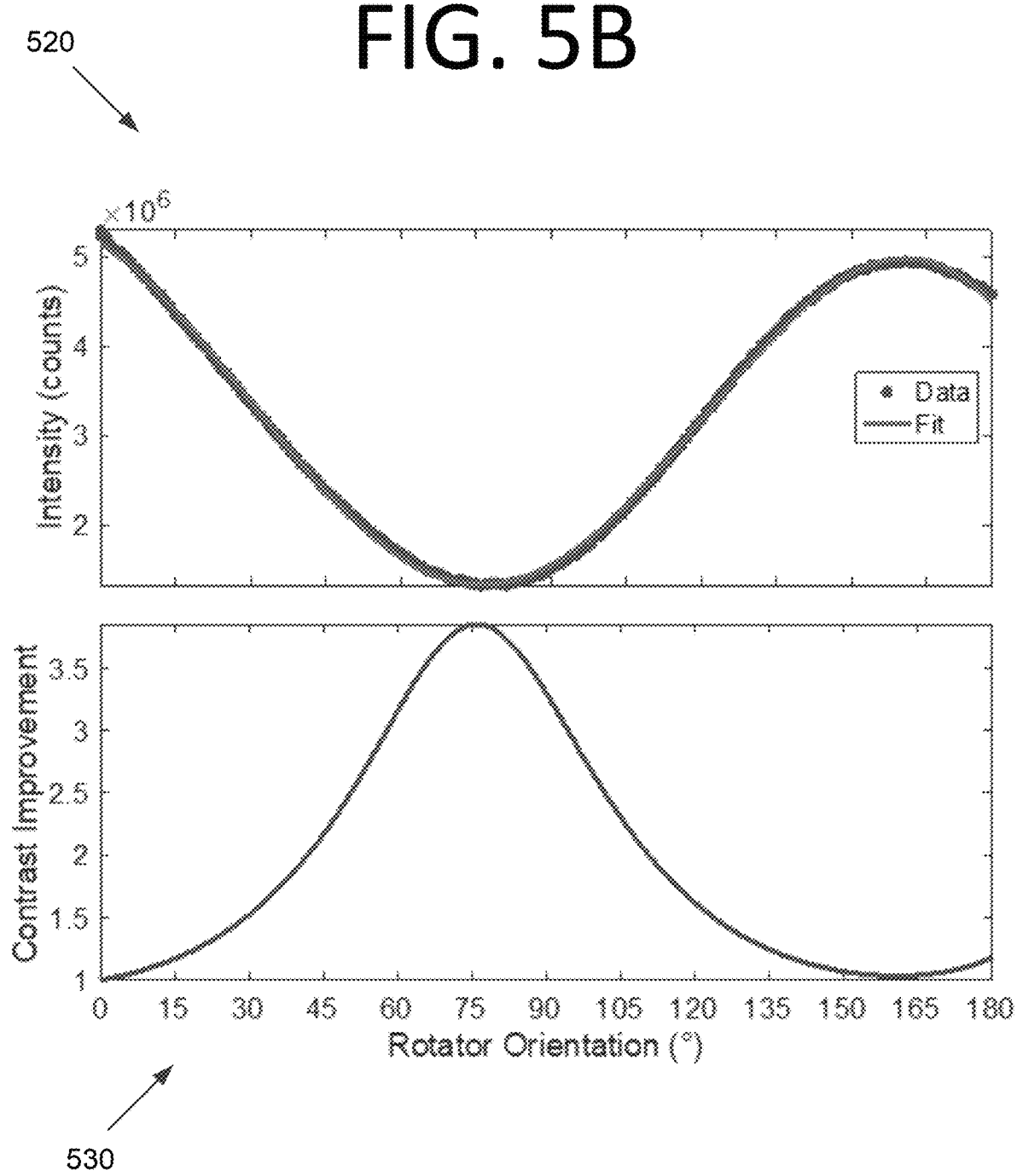
FIG. 5B illustrates intensity count and contrast improvement graphs for the 5.8 visual magnitude planet Uranus, according to an embodiment of the present invention.

FIG. 5B illustrates intensity count and contrast improvement graphs 520, 530 for the 5.8 visual magnitude planet Uranus, according to an embodiment of the present invention. Uranus was observed at 5:45 pm PST on Feb. 10, 2022, which was 10 minutes after sunset. The best polarizer orientation of 76° provides a contrast improvement by a factor of 3.8. The sky polarization was approximately 59%. Contrast improvement has a narrow peak in polarizer orientation (i.e., ~10° wide) and requires a rotatable polarizer in order to maximize it. As the Earth rotates, this optimum orientation changes. Contrast improvement depends on Sun-target geometry, and not on the time of day. The faint limit depends on the time of day. The contrast improvement by a factor of 4 enables observation of fainter objects when the sky is dim at sunset than it does at noon when the sky is bright.

Figure 6:
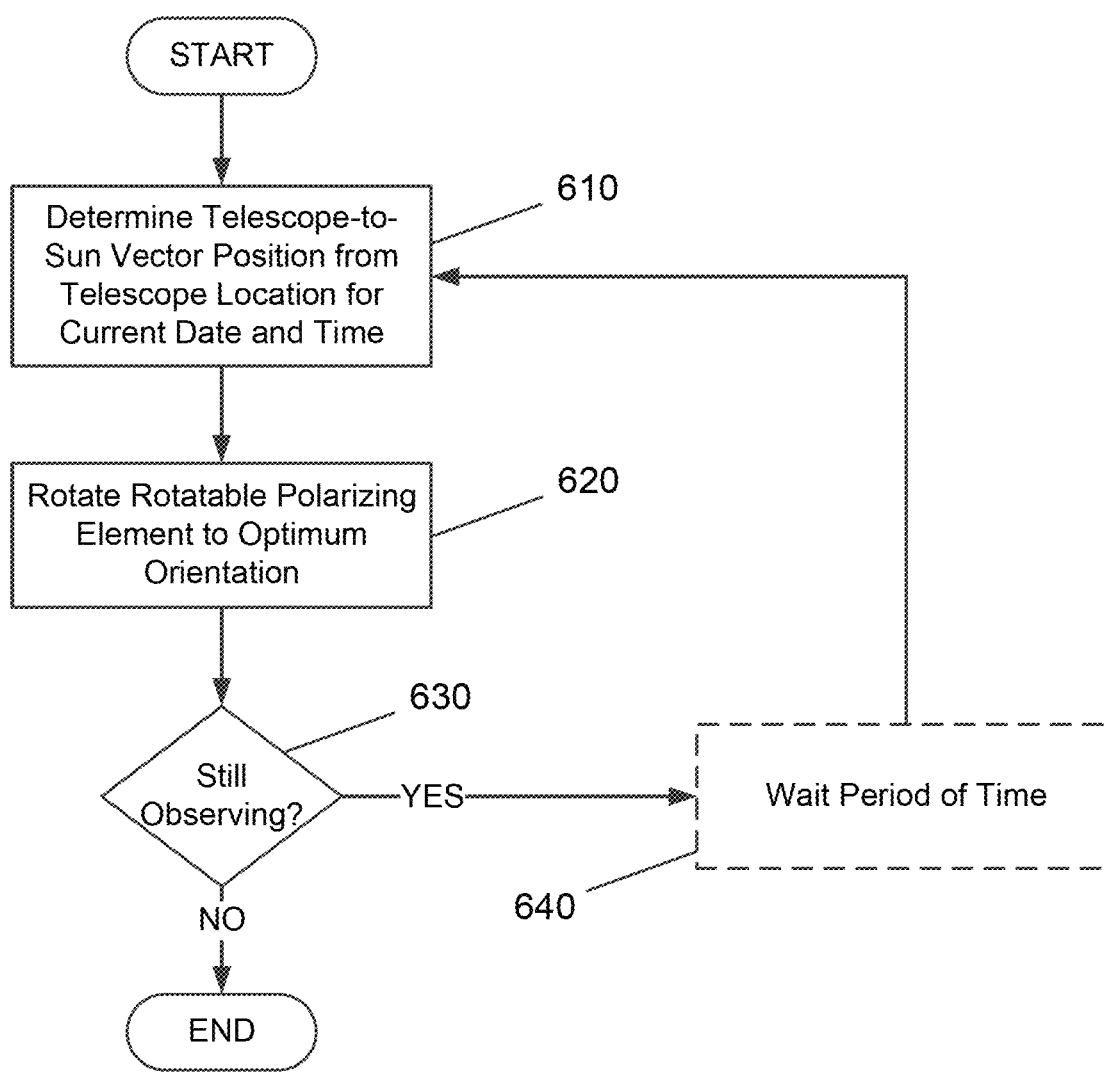
FIG. 6 is a flowchart illustrating a process for performing polarization-aided image contrast enhancement, according to an embodiment of the present invention.

FIG. 6 is a flowchart illustrating a process 600 for performing polarization-aided image contrast enhancement, according to an embodiment of the present invention. The process begins with determining the orientation of the telescope-to-sun vector position of the sun relative to the location of the telescope at the current date and time at 610. This may be calculated using computer scripts or spherical trigonometric equations, for example. The rotatable polarizing element is then rotated to this optimum orientation angle at 620. If the object is no longer being observed at 630, the process ends. Otherwise, the computing system waits a period of time at 640 before returning to step 610. In some embodiments, this repetition may occur once per second or faster, depending on computing resources. In some embodiments, however, calculation of the optimum angle is performed continuously.

FIG. 7 is an architectural diagram illustrating a computing system 700 configured to perform polarization-aided image contrast enhancement, according to an embodiment of the present invention. In some embodiments, computing system 700 may be one or more of the computing systems depicted and/or described herein. Computing system 700 includes a bus 705 or other communication mechanism for communicating information, and processor(s) 710 coupled to bus 705 for processing information. Processor(s) 710 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 710 may also have multiple processing cores, and at least some of the cores may be configured to perform specific functions. Multi-parallel processing may be used in some embodiments. In certain embodiments, at least one of processor(s) 710 may be a neuromorphic circuit that includes processing elements that mimic biological neurons. In some embodiments, neuromorphic circuits may not require the typical components of a Von Neumann computing architecture.

Computing system 700 further includes a memory 715 for storing information and instructions to be executed by processor(s) 710. Memory 715 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 710 and may include volatile media, non-volatile media, or both. The media may also be removable, non-removable, or both. Computing system 700 includes a communication device 720, such as a transceiver, to provide access to a communications network via a wireless and/or wired connection. In some embodiments, communication device 720 may include one or more antennas that are singular, arrayed, phased, switched, beamforming, beamsteering, a combination thereof, and or any other antenna configuration without deviating from the scope of the invention.

Processor(s) 710 are further coupled via bus 705 to a motor 725 of a rotatable polarizing element, photodetector(s) 730, a global positioning system (GPS) receiver 735, a keyboard 740, a mouse 745, and a monitor 750. It should be noted that one or more of 735, 740, 745, 750 may not be present in some embodiments. Memory 715 stores software modules that provide functionality when executed by processor(s) 710. The modules include an operating system 755 for computing system 700. The modules further include a polarization-aided image contrast enhancement module 760 that is configured to perform the operations of the respective source or target system. Computing system 700 may include one or more additional functional modules 765 that include additional functionality.

One skilled in the art will appreciate that a "system" could be embodied as an embedded computing system, a flight computer, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 6 may be performed by a computer program, encoding instructions for the processor(s) to perform at least part of the process(es) described in FIG. 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 710 of computing system 700 of FIG. 7) to implement all or part of the process steps described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A polarization-aided image contrast enhancement system, comprising:
   a photodetector;
   a rotatable polarization element configured to receive light from one or more mirrors of a telescope and located in an optical path between the one or more mirrors of the telescope and the photodetector; and
   a computing system comprising memory and control software stored on the memory, the computing system operably connected to the photodetector and the rotatable polarization element, wherein
   the control software is configured to cause the computing system to control an orientation of the rotatable polarization element,
   the control software comprises scan parameters, and
   the scan parameters are configured to set a start angle, a step size, and a stop angle for changing the orientation of the rotatable polarization element.

2. The polarization-aided image contrast enhancement system of claim 1, wherein the photodetector is configured to send signals from light received from the rotatable polarization element by the photodetector to the computing system for imaging.

3. The polarization-aided image contrast enhancement system of claim 1, wherein the rotatable polarization element comprises:
   a linear polarizer; or
   a waveplate and a static polarization analyzer.

4. The polarization-aided image contrast enhancement system of claim 1, wherein the control software is configured to control an orientation of the rotatable polarization element based on a location of the sun and a pointing location of the telescope.

5. The polarization-aided image contrast enhancement system of claim 4, wherein the control software is configured to point a fast axis of the rotatable polarization element at the sun.

6. The polarization-aided image contrast enhancement system of claim 4, wherein the control software is configured to update the orientation of the rotatable polarization element continuously or periodically.

7. The polarization-aided image contrast enhancement system of claim 1, wherein the rotatable polarization element comprises:
   a controller circuit board; and
   a stepper motor, wherein
   responsive to commands from the control software of the computing system regarding where to rotate and how many steps to wind, the controller circuit board is configured to cause the stepper motor to wind the commanded number of steps to control the orientation of the rotatable polarization element.

8. The polarization-aided image contrast enhancement system of claim 1, wherein the rotatable polarization element comprises:
a rotation stage;
a polarizer configured to introduce polarization to light passing through the polarizer, the polarizer operably connected to the rotation stage;
a controller circuit board configured to control rotation of the rotation stage; and
an interface plate to which the rotation stage, the polarizer, and the controller circuit board are mated.

9. The polarization-aided image contrast enhancement system of claim 1, wherein the control software is configured to cause the computing system to:
determine an orientation of a telescope-to-sun vector position of the sun relative to a pointing location of the telescope at a current date and time; and
command the rotatable polarizing element to rotate to the determined orientation.

10. A polarization-aided image contrast enhancement system, comprising:
a rotatable polarization element configured to receive light from one or more mirrors of a telescope; and
a computing system comprising memory and control software stored on the memory, the computing system operably connected to the rotatable polarization element, wherein
the control software is configured to cause the computing system to control an orientation of the rotatable polarization element,
the control software comprises scan parameters, and
the scan parameters are configured to set a start angle, a step size, and a stop angle for changing the orientation of the rotatable polarization element.

11. The polarization-aided image contrast enhancement system of claim 10, wherein the rotatable polarization element comprises:
a linear polarizer; or
a waveplate and a static polarization analyzer.

12. The polarization-aided image contrast enhancement system of claim 10, wherein the control software is configured to control an orientation of the rotatable polarization element based on a location of the sun and a pointing location of the telescope.

13. The polarization-aided image contrast enhancement system of claim 12, wherein the control software is configured to point a fast axis of the rotatable polarization element at the sun.

14. The polarization-aided image contrast enhancement system of claim 12, wherein the control software is configured to update the orientation of the rotatable polarization element continuously or periodically.

15. The polarization-aided image contrast enhancement system of claim 10, wherein the rotatable polarization element comprises:
a controller circuit board; and
a stepper motor, wherein
responsive to commands from the control software of the computing system regarding where to rotate and how many steps to wind, the controller circuit board is configured to cause the stepper motor to wind the commanded number of steps to control the orientation of the rotatable polarization element.

16. The polarization-aided image contrast enhancement system of claim 10, wherein the rotatable polarization element comprises:
a rotation stage;
a polarizer configured to introduce polarization to light passing through the polarizer, the polarizer operably connected to the rotation stage;
a controller circuit board configured to control rotation of the rotation stage; and
an interface plate to which the rotation stage, the polarizer, and the controller circuit board are mated.

17. The polarization-aided image contrast enhancement system of claim 10, wherein the control software is configured to cause the computing system to:
determine an orientation of a telescope-to-sun vector position of the sun relative to a location of the telescope at a current date and time; and
command the rotatable polarizing element to rotate to the determined orientation.

18. A polarization-aided image contrast enhancement system, comprising:
a rotatable polarization element configured to receive light from one or more mirrors of a telescope; and
a computing system comprising memory and control software stored on the memory, the computing system operably connected to the rotatable polarization element, wherein
the control software is configured to cause the computing system to:
determine an orientation of a telescope-to-sun vector position of the sun relative to a location of the telescope at a current date and time, and
command the rotatable polarizing element to rotate to the determined orientation, and
the control software comprises scan parameters, and
the scan parameters are configured to set a start angle, a step size, and a stop angle for changing the orientation of the rotatable polarization element.

19. The polarization-aided image contrast enhancement system of claim 18, wherein the control software is configured to update the orientation of the rotatable polarization element continuously or periodically.

20. The polarization-aided image contrast enhancement system of claim 18, wherein the rotatable polarization element comprises:
a controller circuit board; and
a stepper motor, wherein
responsive to commands from the control software of the computing system regarding where to rotate and how many steps to wind, the controller circuit board is configured to cause the stepper motor to wind the commanded number of steps to control the orientation of the rotatable polarization element.

21. The polarization-aided image contrast enhancement system of claim 18, wherein the rotatable polarization element comprises:
a rotation stage;
a polarizer configured to introduce polarization to light passing through the polarizer, the polarizer operably connected to the rotation stage;
a controller circuit board configured to control rotation of the rotation stage; and
an interface plate to which the rotation stage, the polarizer, and the controller circuit board are mated.

* * * * *